G. E. SIINO.
SPRING TIRE.
APPLICATION FILED MAY 16, 1921.

1,391,985.

Patented Sept. 27, 1921.

Inventor.
Gaetano E. Siino
By Book & Book
Attorneys.

UNITED STATES PATENT OFFICE.

GAETANO E. SIINO, OF PITTSBURG, CALIFORNIA.

SPRING-TIRE.

1,391,985.   Specification of Letters Patent.   Patented Sept. 27, 1921.

Application filed May 16, 1921. Serial No. 469,832.

*To all whom it may concern:*

Be it known that I, GAETANO E. SIINO, a citizen of the United States, residing at Pittsburg, in the county of Contra Costa and State of California, have invented certain new and useful Improvements in Spring-Tires, of which the following is a specification.

My invention relates to that general class of tires for vehicle wheels in which the inherent pliability or resiliency of the tire substance is supplemented by associated spring members; and, particularly, it relates to that type embraced in said class in which the spring members are intimately incorporated in said substance.

The object of my invention is to provide a tire whose resiliency is not dependent upon a confined interior air body, and in which, on account of the shape, arrangement and fastening of the spring members incorporated in the cushion or pliable body or substance of the tire, a more complete distribution of resistance to distortion stresses is obtained, consistent with the resiliency required.

To this end my invention consists in the novel spring-tire which I shall now describe, by reference to the accompanying drawings, in which Figure 1 is a cross-section of my tire.

Figure 1:
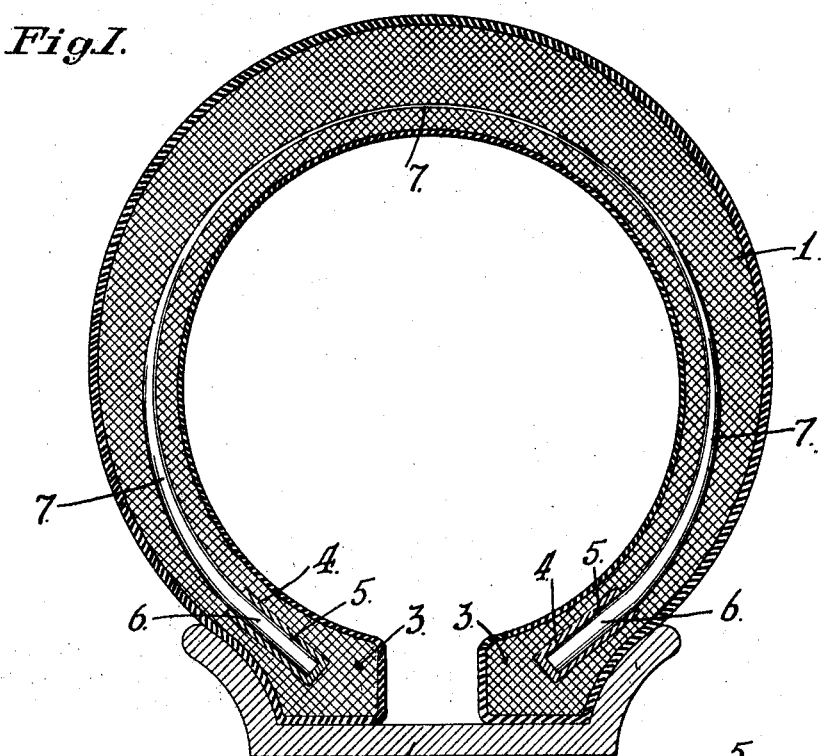

1 is the cushion or pliable body of the tire. This may be formed of any suitable material, such as rubber or a combination of rubber and fabric built up in the customary manner, and may be of any suitable shape. In practice, I prefer to use the shape shown in cross-section in Fig. 1, it being longitudinally open in its base region, which is similar to that of the usual pneumatic tire casing. My tire, when so formed, resembles the usual pneumatic tire in exterior appearance, and may be mounted upon the usual pneumatic tire rim, shown in section at 2, so that it is interchangeable with a pneumatic tire of similar size. There is considerable commercial advantage in this, for the reason that existing vehicles may be equipped with my spring-tires without necessitating additional expense for specially constructed rims. Moreover, when so formed, my spring-tire may be supplemented by the use of any usual interior pneumatic tube, not shown in the drawings, to enable it to support additional weight. It is to be distinctly understood, however, that such use of an interior pneumatic tube is not necessary except in unusual instances in which a tire of a given size is required to support excessive weight, for the inherent strength and resiliency of the body of my spring-tire is sufficient to support as much weight as an ordinary pneumatic tire of corresponding size. I naturally prefer to use my spring-tire without an interior pneumatic tube, thus eliminating the usual troubles and disadvantages of a pneumatic tire.

Figure 2:
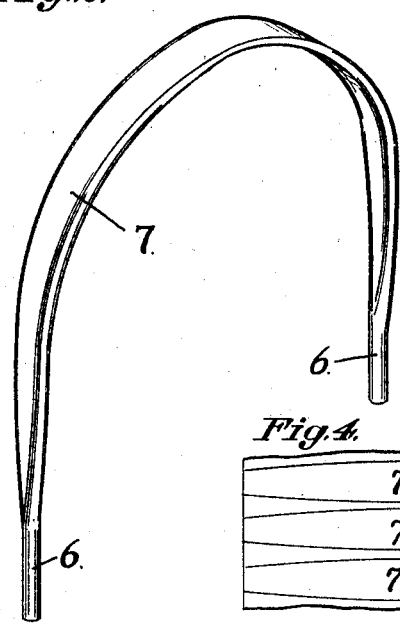
Fig. 2 is a perspective view of one of the spring members.
Figure 3:
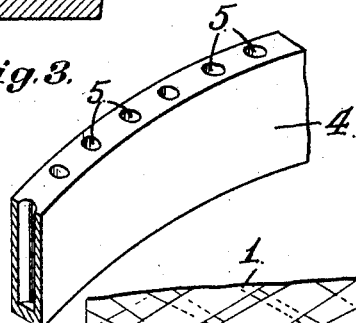
Fig. 3 is a perspective view of a broken section of the holding ring for the spring members.

Within the base portions 3 of my tire are embedded holding rings 4, preferably of metal, one in each side, and each provided with a series of spaced sockets 5, Figs. 1 and 3, into which are fitted the end portions 6 of the spring members 7. Said spring members are best made of steel, one of these being shown in Figs. 1 and 2. They are embedded in and closely incorporated with the substance of the cushion body 1, of the tire, and extend from one holding ring 4 to the other, traversing the side and tread regions of the body. The end portions 6 of said spring members are preferably cylindrical, to fit closely within the sockets 5 of the holding rings 4, and their central portions are gradually flattened and widened, as shown, in order to properly distribute the distortion stresses throughout the various portions of the tire body, and obtain from said members the highest effect of their inherent resiliency.

Figure 4:
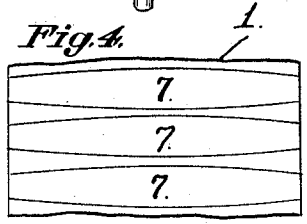
Fig. 4 is a diagrammatic view of a portion of the tire body showing the spring members in a parallel arrangement traversing the tread region of the body.
Figure 5:
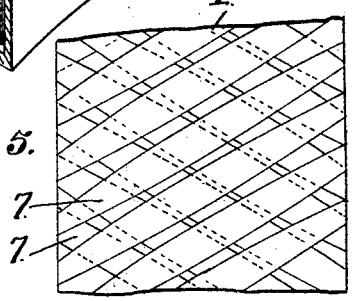
Fig. 5 is a similar view of a portion of the tire showing a criss-cross diagonal arrangement of the spring members.

The spring members 7 may be arranged in parallel relation transversely of the tire body, as indicated in Fig. 4, or they may be arranged in diagonal criss-cross relation, as indicated in Fig. 5, thereby giving additional strength and stiffness to the tread, or central region of the tire.

The spring members 7 are relied upon to impart the necessary strength and resiliency to the cushion tire substance 1, and are securely held in position by the holding rings 4, as well as by being embedded within said substance. Moreover, if a pneumatic tube should be used within the body of the tire, said spring members also serve as an armor to reduce the liability of puncture or rupture of such tube.

My invention has been herein described and is herewith illustrated in its preferred form, but it is to be understood that changes, within the scope of the claims hereto appended, may be made in said form without affecting the essential principles of the invention or departing in any degree from the spirit thereof.

I claim:—

A spring-tire comprising a cushion body longitudinally open at its base; holding-rings embedded in the body base one on each side of its opening; and a plurality of spring members embedded in said body, the ends of said members being fitted into the holding rings, and said members thence extending and traversing the side and tread regions of the body.

In testimony whereof I have signed my name to this specification.

GAETANO E. SIINO.